Patented May 24, 1938

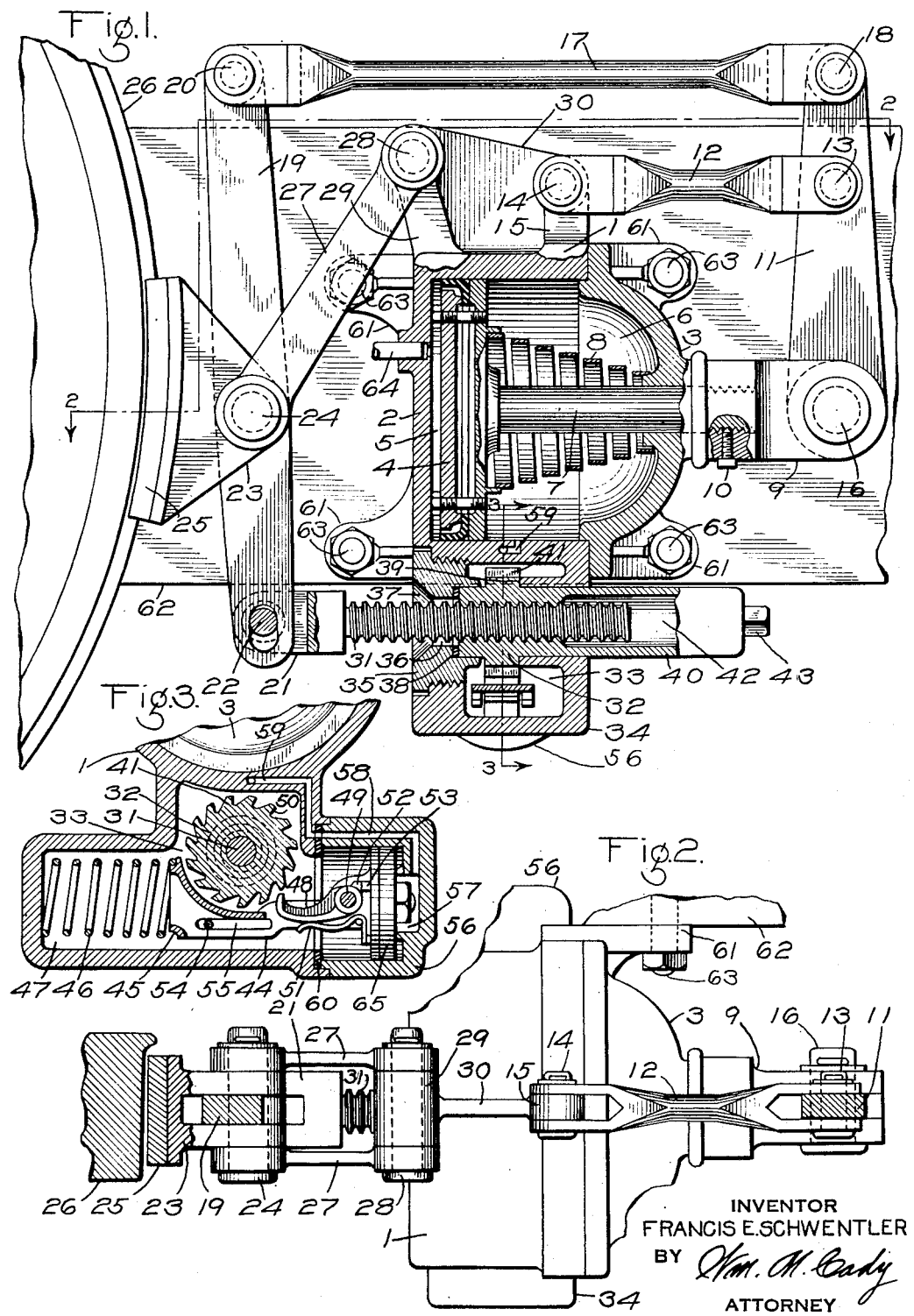

2,118,236

UNITED STATES PATENT OFFICE 2,118,236

UNIT BRAKE STRUCTURE

Francis E. Schwentler, St. Louis, Mo., assignor to The American Brake Company, St. Louis, Mo., a corporation of Missouri Application November 17, 1936, Serial No. 111,220

5 Claims. (Cl. 188—153)

This invention relates to brake equipment or brake rigging for use on railway car trucks or the like and more particularly to that type employing a brake shoe adapted to be moved into and out of braking engagement with a wheel through the medium of levers and rods operated by a brake cylinder, and in which a slack adjuster is used to take up slack which may develop in the brake rigging.

One object of the invention is to provide an improved brake structure of the above type.

Another object of the invention is to provide an improved structure of the above type which is applicable to and removable from the car truck as a unit.

A more specific object of the invention is to provide a compact unit brake structure for a car wheel comprising a brake cylinder adapted to be secured to a car truck and carrying the brake shoe, slack adjuster and necessary rods and levers connecting the brake cylinder to the brake shoe, whereby the structure may be applied to and removed from the car truck as a unit.

Other objects and advantages will be apparent from the following more detailed description of the invention.

In the accompanying drawing; Fig. 1 is a side elevation of a portion of a car truck and wheel with the improved unit brake structure shown partly in section and applied to the truck in braking relation to the wheel; Fig. 2 is a plan view, mainly in outline, of a portion of the apparatus shown in Fig. 1; and Fig. 3 is a transverse sectional view taken on the line 3—3 in Fig. 1.

As shown in the drawing, the improved unit brake structure comprises a brake cylinder which includes a body 1 having a bore closed at one end by a pressure head 2 which is preferably an integral part of the body 1, and closed at the opposite end by a non-pressure head 3 which is secured to the body 1 in the usual manner.

A brake cylinder piston 4 is mounted to reciprocate in the bore in the body 1 and has at one side a pressure chamber 5 and at the opposite side a non-pressure chamber 6 which is open to the atmosphere in the usual manner.

A push rod 7 is secured to the non-pressure side of the piston 4 and extends through chamber 6 and a suitable bore in the non-pressure head 3 and in said bore slidably engages said non-pressure head. A release spring 8 is disposed in chamber 6 with one end engaging the piston 4 and the other end engaging the non-pressure head 3. This spring is preferably of a conical coil type which requires a minimum of space when compressed and thereby permits the use of a relatively shallow non-pressure head.

A cross-head 9 is secured to the end of push rod 7, outside of the non-pressure head, preferably by screw-threaded engagement, and a set screw 10 is provided in said cross-head and engages said push rod for preventing the push rod from turning relative to the cross-head.

A live brake lever 11 is pivotally connected to the brake cylinder body 1 preferably through the medium of a pull rod 12 having one end connected to said lever by a pin 13 and the other end connected by a pin 14 to a lug 15 which extends from the brake cylinder body 1 and which is preferably formed integral therewith. One end of this lever is pivotally connected to cross-head 9 by means of a pin 16 while the other end is pivotally connected to one end of a push rod 17 by means of a pin 18.

A dead brake lever 19 is disposed at the end of the brake cylinder opposite the live brake lever 11, with one end pivotally connected to the push rod 17 by means of a pin 20 and the opposite end pivotally connected to a slack adjuster cross-head 21 by means of a pin 22, said opposite end having a longitudinal slot through which the pin freely extends. The dead brake lever 19 is connected intermediate its ends to a brake head 23 by means of a pin 24, said brake head carrying a brake shoe 25 adapted to be moved into and out of braking engagement with the tread of a car wheel 26.

A pair of brake hangers 27 have one end pivotally connected by means of a pin 28 to a lug 29 which is preferably formed integral with the brake cylinder body 1 at the end opposite the lug 15, these lugs being connected together by a strengthening rib 30. The other ends of the hangers 27 are pivotally connected to the brake head 23 by means of the pin 24, said hangers being adapted to maintain the brake shoe 25 in proper braking relation with the tread of car wheel 26 in the usual well known manner.

The slack adjuster cross-head 21 is secured to one end of a slack adjuster screw 31 in any suitable manner which will prevent turning of the screw. This screw extends through and has screw-threaded engagement with a ratchet operated adjusting nut 32 which is rotatably disposed in a chamber 33 formed in an integral extension 34 of the brake cylinder body 1.

The chamber 33 is open at the end facing cross-head 21 for insertion of the adjusting nut 32. The open end of chamber 33 is closed by a cover 35 which is secured to the brake cylinder body extension 34, preferably by screw-threaded engagement.

The cover 35 is provided with an axial bore 36 through which the screw 31 freely extends. This bore opens at one end to a conical shaped recess 37 provided in the outer face of the cover and at the opposite end to a counterbore in which is rotatably disposed one end of the adjusting nut 32, a thrust washer or bearing 38 being disposed in the bottom of said counterbore and being engaged by said end of said adjusting nut.

The brake cylinder body extension is provided with a shoulder 39 which surrounds an opening formed through the right hand end wall of chamber 33 concentric with the bore 36 in the cover 35. A sleeve-like extension 40 of the adjusting nut 32 is rotatably disposed in this concentric opening with one face of a ratchet toothed wheel 41, provided on and preferably integral with the adjusting nut 32, bearing against the shoulder 39. The nut 32 is thus carried in aligned bores in the cover 35 and brake cylinder body extension 34 and between the thrust washer 38 and shoulder 39 which coact to limit longitudinal movement of said nut. The adjusting nut extension 40 is provided with an axial chamber 42 adapted to receive the screw 31, while on the outer end of said extension there is provided a hexagonal or other polygonal shaped extension 43 to which a wrench or the like may be applied for purposes which will be hereinafter described.

Mechanism for turning the nut 32 on the screw 31 is disposed transversely of the screw and comprises a piston 65 having a stem 44 which bridges the pripheral face of the toothed wheel 41 and terminates in a follower 45. A spring 46 is disposed in a chamber 47, formed in the brake cylinder body extension or slack adjuster casing 34, with one end engaging the end wall of the chamber and the other end engaging the outer face of the follower 45.

A pawl 48 is pivotally mounted on a pin 49 secured to the piston stem 44 in operating relation with ratchet teeth 50 provided on the wheel 41. A spring 51 is provided on the stem 44 and engages the pawl 48 for urging said pawl toward the teeth 50, while a lug 52 is provided on the pawl and is adapted to engage a lug 53 on the piston 65 for limiting movement of said pawl by said spring. A pin 54 in the brake cylinder body extension extends through a slot 55 in the piston stem 44 for supporting one end of said stem and thereby coacts with the piston 65 to maintain the pawl 48 in the proper working relation with the ratchet teeth 50.

For the purpose of assembling the piston 65, stem 44 and spring 46, the piston is mounted in a bore in a removable cup-shaped cover 56 which is secured to the brake cylinder body extension 34. The piston 65 is open at one side to the chamber 33 which is in turn open to the atmosphere in the usual manner. A chamber 57 is formed at the opposite side of piston 65 and is adapted to be connected to the brake cylinder piston chamber 5 when the brake cylinder piston 4 is moved a greater distance than desired by fluid under pressure supplied to said chamber 5. This connection may be made in any suitable manner, but in order to obtain the most simple and compact unit equipment, the connection is preferably made by a cored passage 58 in the cover 56, which passage opens at one end to chamber 57 and at the opposite end to a cored passage 59 in the brake cylinder body 1, the passage 59 leading to and opening at the surface of the bore containing the brake cylinder piston 4. This opening of passage 59 to the bore containing piston 4 is so located with respect to movement of said piston as to connect said passage to piston chamber 5 when said movement, or in other words the piston travel, exceeds a predetermined degree. A gasket 60 is provided in the joint between the brake cylinder body extension 34 and cover 56 and through this gasket a port is provided to establish communication between passages 58 and 59.

The brake cylinder body 1 is provided with a plurality of spaced bolting lugs 61 through the medium of which the brake structure is adapted to be secured, as a unit, to any suitable part of a truck frame, such as a side member 62, by means of bolts 63.

From the above description and an inspection of the drawings it will be evident that since the brake cylinder body 1 carries all of the operating parts of the improved brake structure or rigging, that is the brake levers and rods, slack adjuster, hangers and thereby the brake shoe, that the brake structure may, if desired, be assembled off of the truck and then either applied to or removed from the truck as a unit. This compact unit structure therefore eliminates the difficulties usually involved in locating and mounting a brake cylinder, levers, rods, and other parts of an equipment on various parts of the car, and also simplifies inspection and repairs. A further feature of the unit construction resides in its particular adaptability to the modern trend of applying an independent brake rigging to each wheel of a truck.

With the brake structure applied to a truck as above described, if it is desired to effect an application of the brakes, fluid under pressure is supplied to the brake cylinder piston chamber 5 through the usual brake cylinder pipe 64 and acts to move the brake cylinder piston 4 in the direction toward the non-pressure head 3. This movement of the brake cylinder piston is transmitted through the push rod 7, cross-head 9, lever 11 and push rod 17 to the dead brake lever 19 which is turned about the fulcrum pin 22 and thereby acts to move the brake shoe 25 into frictional or braking engagement with the tread of the wheel 26.

The opening of passage 59 into the brake cylinder is so located that if the movement of the brake cylinder piston 4 exceeds a predetermined, desired degree this passage is opened to chamber 5 which permits fluid under pressure to flow from chamber 5 through passages 59 and 58 to the slack adjuster piston chamber 57 wherein said pressure acts on and moves the piston 65 toward the left hand, as viewed in Fig. 3 of the drawing, thereby compressing spring 46. As the piston 65 is thus moved, the pawl 48 is moved over or relative to the teeth 50 on the adjuster nut ratchet wheel 41 to a position at the left hand side of the axis of the screw 31.

In order to effect a release of the brake shoe 25 from the wheel 26, fluid under pressure is vented from the brake cylinder piston chamber 5 by way of pipe 64 in the usual well known manner. When the pressure of fluid in chamber 5 is thus reduced sufficiently, the release spring 8 moves the piston 4 to the release position. This movement of the piston 4 acts through the push rod 7, cross-head 9, lever 11, rod 17 and lever 19 to pull the shoe 25 out of braking engagement with the wheel 26.

If in applying the brakes passage 59 is connected to chamber 5 to effect operation of the slack adjuster device in the manner above described, then when said passage is connected to chamber 6 upon movement of said piston toward release position, fluid under pressure is vented from the slack adjuster piston chamber 57 to chamber 6 and from thence to the atmosphere.

Upon the release of fluid under pressure from the slack adjuster piston chamber 57, the spring 46 acts to return the piston 65 to its normal position and during such movement, the engagement of pawl 48 with one of the teeth 50 on the ratchet gear 41 turns the nut 32 in a counter clockwise direction, as viewed in Fig. 3 of the drawing. As the piston 65 nears its normal position, lug 52 on the pawl 48 engages stop 53 on said piston which releases said pawl from the ratchet wheel 41.

This turning of the nut 32 on the screw 31 urges the screw 31 outwardly in a direction toward the left hand, as viewed in Fig. 1 of the drawing, and thereby urges the brake shoe 25 towards the car wheel 26 and thus reduces the clearance space between said shoe and wheel.

The slack adjuster will be operated as above described each time the brake cylinder piston 4 moves sufficiently to connect passage 59 to chamber 5 and thereby will act to maintain the travel of the brake cylinder piston 4 at substantially the constant and desired degree throughout the life of or as the brake shoe 25 wears away.

When it becomes necessary to apply a new brake shoe 25, a wrench is applied to the squared end 43 of the sleeve 40, and said sleeve is then operated to turn the nut 32 in a clockwise direction, as viewed in Fig. 3 of the drawing. This manual turning of the nut is permitted when the brakes are released due to the pawl 48 being disengaged from the ratchet teeth 50, and results in the screw 31 being drawn through the nut into chamber 42.

When the screw 31 is thus manually returned to its inner position in chamber 42, the worn shoe 25 is removed and a new shoe is applied, in the usual manner. If the clearance space between the new shoe and wheel 26 is greater than desired, the sleeve 40 may then be manually turned to force the screw 31 outwardly and thereby force the shoe 25 towards the wheel 26 until said clearance space is of the required amount.

If the clearance space between the new shoe 25 and wheel 26 is not manually adjusted as just described, it will be automatically adjusted by operation of the slack adjuster upon subsequent applications of the brakes in the manner hereinbefore described, as will be evident.

It will now be seen that the improved brake rigging or structure is a compact mechanism adapted to be applied to or removed from a car truck as a unit and is particularly adapted to the braking of one wheel on a truck. This compact unit brake structure being all built around and carried by the brake cylinder tends to reduce difficulties in inspection and repairs to a minimum, and also reduces the possibility of excess piston travel being required to provide a certain movement of the brake shoe as may occur in conventional structures of the type in which the elements are spread out over and secured to relatively movable parts of a car.

While one illustrative embodiment of the invention has been described in detail, it is not my invention to limit its scope to that embodiment or otherwise than by the terms of the appended claims.

Having now described my invention, what I claim as new and desire to secure by Letters Patent, is:

1. A unitary brake structure comprising a brake shoe, a brake cylinder, a piston in said brake cylinder, and braking members including a live lever and a dead lever carried by the brake cylinder and operatively connecting said piston with said brake shoe.

2. A unitary brake structure comprising a brake shoe, a brake cylinder including a body, a brake cylinder piston mounted in said body, a live lever operatively connected to said brake cylinder piston, a dead lever operatively connected to said brake shoe and having a fulcrum connection with said body, a brake hanger pivotally mounted on said body and carrying said brake shoe, and a member operatively connecting said levers.

3. A unitary brake structure comprising a brake shoe, a brake cylinder including a body, a brake cylinder piston mounted in said body, a live lever pivotally connected to one end of said body and operative by said piston, a dead lever for operating said shoe pivotally connected to the other end of the body, and a braking member operatively connecting said levers.

4. A unitary brake structure comprising a brake shoe, a brake cylinder including a body, a brake cylinder piston mounted in said body, a live lever pivotally connected to said body and piston, a dead lever connected to said shoe, a rod connecting said levers, and a slack adjuster carried by said body and providing a fulcrum for said dead lever.

5. A unitary brake structure comprising a brake shoe, a brake cylinder including a body, a brake cylinder piston mounted in said body, a lug projecting from the upper surface of said body, a hanger pivotally connected at one end to said lug and at the other end to said shoe, a slack adjuster secured to the lower surface of said body, a dead lever fulcrumed on said adjuster and adapted to operate said shoe, a live lever carried by said body and pivotally connected to said piston, and a rod connecting said levers.

FRANCIS E. SCHWENTLER.